United States Patent [19]
May et al.

[11] Patent Number: 5,616,975
[45] Date of Patent: Apr. 1, 1997

[54] INTEGRAL CONNECTOR AND MOTOR HOUSING

[75] Inventors: Kevin M. May; S. Duke Snider; Daniel R. Messner, all of St. Louis County, Mo.

[73] Assignee: Emerson Electric Co., St. Louis, Mo.

[21] Appl. No.: 240,635

[22] Filed: May 11, 1994

[51] Int. Cl.⁶ ................................................. H02K 5/00
[52] U.S. Cl. ................................................ 310/89; 310/71
[58] Field of Search ............................ 310/89, 71, 68 R, 310/67 R

[56] References Cited

U.S. PATENT DOCUMENTS

| | | | |
|---|---|---|---|
| 3,622,822 | 11/1971 | Lofstrand | 310/89 |
| 4,690,366 | 9/1987 | Loup | 310/89 |
| 4,851,725 | 7/1989 | Keck | 310/71 |
| 4,866,317 | 9/1989 | Katayama | 310/89 |
| 4,978,876 | 12/1990 | Koster | 310/89 |
| 5,126,608 | 6/1992 | Sogabe et al. | 310/71 |
| 5,315,195 | 5/1994 | Bradfield et al. | 310/89 |
| 5,532,534 | 7/1996 | Baker et al. | 310/89 |

FOREIGN PATENT DOCUMENTS

565312  10/1993  European Pat. Off. .

Primary Examiner—Steven L. Stephan
Assistant Examiner—Jonathan Link
Attorney, Agent, or Firm—Polster, Lieder, Woodruff & Lucchesi

[57] ABSTRACT

A motor with a hollow housing with an open mouth defined by a side wall, and a cover for its mouth, an electrical motor circuit and power conductors electrically connected to the circuit at one end and adapted to be connected to a source of power at another end, has, when it is assembled, a current supply connecter receptacle. The housing has integral with it, a housing receptacle part with conductor-receiving seats in which the power conductors are seated. The cover has a cover receptacle part integral with the cover. The cover is latched into position, closing the housing mouth and completing the receptacle, by at least one deflectable finger, one end of which is integral with one of the cover and housing and a free end of which is provided with a latching lip, and a complementary ledge integral with the other of the housing and cover, the ledge being spaced and shaped to receive and be engaged by the lip. Provision is made for permitting the lip to be displaced from the ledge to free the cover. Preferably, two fingers, both integral with the cover, are provided, ledges being formed on the housing receptacle part.

6 Claims, 6 Drawing Sheets

INTEGRAL CONNECTOR AND MOTOR HOUSING

RELATED APPLICATIONS

This application is related to co-pending application Ser. No. 237,782/08, filed May 4, 1994, Hoemann et al., High Efficiency Power Supply and Control for Brushless Permanent Magnet Motor; Ser. No. 237,780/08, filed May 4, 1994, now U.S. Pat. No. 5,574,321 Baker, Integral Refrigerator Motor Fan Blades; Ser. No. 240,629/08, filed May 11, 1994, Baker et al., Electrical Connection of Printed Circuit Board to Line Leads on Brushless Permanent Magnet Refrigeration Motors; and Ser. No. 240,633/08, filed May 11, 1994, now U.S. Pat. No. 5,532,534 Baker et al., Brushless Permanent Magnet Condenser Motor for Refrigeration, all assigned to the assignee of the present invention, the disclosures of which are incorporated herein by reference.

BACKGROUND OF THE INVENTION

This invention relates to dynamoelectric machines in the form of electric motors. While the invention is described with particularity with respect to brushless permanent magnet (BPM) motors, those skilled in the art will recognize the wider applicability of the inventive principles disclosed hereinafter.

There has been, and continues to be, a movement toward high operating efficiency devices. That movement includes a move by appliance manufacturers to provide high efficiency consumer appliances for general use. Certain improvements in such appliance efficiency are more obvious than others. For example, the ubiquitous household refrigerator has at least three electric motors associated with it. They include a hermetic compressor motor which drives the compressor for the refrigerant system, an evaporator motor, and, in many refrigerators, a condenser motor. The general operation of the refrigeration system of the conventional refrigerator is well known. The compressor moves the refrigerant from the evaporator into the condenser. It then forces the refrigerant back to the evaporator through an expansion valve. Refrigerant vapor leaves a compressor at high pressure. As it flows into the condenser, the high pressure causes the vapor to condense back to liquid refrigerant. As this happens, the vapor gives out heat, making the condenser warm. The condenser is at the back of the refrigerator, and heat flows into the air around the refrigerator, often with the aid of the aforementioned condenser fan. The refrigerant leaves the expansion valve at low pressure, causing it to evaporate inside the pipe and get cold. The evaporator is inside the refrigerator and heat flows into the evaporator, making the refrigerator cold. Again, a fan is used to force air over the evaporator and distribute the cool air throughout the refrigerator interior.

Refrigerators operate day and night and because of that operation, their operation cost is relatively substantial, even when attempts are made to increase their efficiency. Recently, there has been an industry-wide effort by refrigerator OEMs (original equipment manufacturers) to raise the level of refrigerator efficiency.

As will be appreciated by those skilled in the art, brushless permanent magnet motors in operational use offer the best efficiency presently known for electric motors in general use, although switched reluctance motors (SRM) and controlled induction motors (CIM) often are configured to achieve substantially equivalent performance. In the size of the motor of this invention, the brushless permanent magnet motor was found to offer the best engineering solution. A brushless permanent magnet motor is similar to other motor types in that it includes a stator assembly having a core of laminations formed from suitable magnetic material. The core has winding receiving slots formed in it. The rotor assembly commonly is the component that distinguishes a permanent magnet motor from other motors. Unlike other conventional motor constructions, a BPM rotor has at least one permanent magnet associated with it. The motor may be either of a conventional design, in which the stator assembly has an axial opening through the core for reception of the rotor assembly, or the motor can be a so-called inside out motor, which has the rotor assembly outboard of the stator.

While brushless permanent magnet motors offer higher efficiencies, they require an electronic circuit for applying electrical energy to the motor windings for proper operation of the motor. The control circuits required for motor operation often make application of the permanent magnet motor economically unjustifiable.

Condenser and evaporator fans in refrigerators conventionally are small and low cost designs. The low cost design of these motors commonly equates with a relatively low efficiency design. I have found that the lower efficiency evaporator or condenser motors can be replaced with more efficient permanent magnet motors when the assembly and construction techniques disclosed hereinafter are employed for and in the motor design, and the motor control functions are accomplished in accordance with the various disclosures incorporated by reference.

One of the objects of this invention is to provide an economically producible permanent magnet condenser fan motor.

Another object of this invention is to provide a motor design which can be incorporated into a variety of applications.

Yet another object of this invention is to provide a motor base-enclosure that permits easy connection to current supply conductors, which are held securely in place;

Yet another object is to provide such a base-enclosure with a cover that is readily mountable and demountable.

Other objects of this invention will be apparent to those skilled in the art in light of the following description and accompanying drawings.

SUMMARY OF THE INVENTION

In accordance with this invention, generally stated, a motor, in the preferred embodiment described, a brushless permanent magnet motor, is provided with an open-bottomed cup-shaped base-enclosure or housing. The housing has a side wall and a top wall defining an interior space. In the preferred embodiment shown, a printed circuit board is mounted above the top wall on an outside surface of the top wall. A motor control board is mounted within the housing. Electrical conductors, electrically connected to a printed circuit on the printed circuit board, extend from the printed circuit board through the top wall and are electrically connected to the motor control board. Current supply conductors are electrically connected to the motor board. The current supply conductors are mounted in a receptacle, part of which is of a piece with the housing, and part, of a piece with a cover that serves as a closure for the housing. In the preferred embodiment, both housing and cover are made of an electrically insulative material. In any event, the cover is made of a resilient plastic. One of the base cover and housing has one or more latching fingers of a piece with it, and the other, a complementary ledge, which is engaged by a lip on the finger. In the preferred embodiment, two latching fingers are provided, of a piece with the cover receptacle part, and two ledges, of a piece with the housing receptacle part. The fingers are deflectable. In the preferred embodiment, the fingers are part of the cover receptacle, and the ledges are formed in the housing receptacle. Each lip engages a surface of the ledge remote from an inner surface of the cover to complete the receptacle and to hold all of the cover in housing closing position. The fingers are spaced a distance equal to or slightly less than the distance between the ledges, the lips projecting in the direction of the ledges and being spaced to project over the ledges when the cover is installed. In installing the cover, and completing the receptacle, the fingers are cammed away by a surface of the receptacle, permitted by the deflection of the fingers, and when the lips clear the upper surface of the ledge, they spring into latching position over the ledge. After they are installed, the fingers can be deflected manually to displace the lip from ledge-engaging condition to release the fingers, hence the cover.

In the preferred embodiment, the outer edge of the side wall of the enclosure is generally circular in plan, and is stepped to provide a seat for the cover. The cover, which is generally circular in plan, has an inwardly projecting peripheral rim that is stepped complementarily to the enclosure edge step, and both receptacle parts extend chordally outwardly from the rim. The latching arrangement is external of the housing, so as to be readily accessible.

DESCRIPTION OF THE PREFERRED EMBODIMENT

Figure 1:
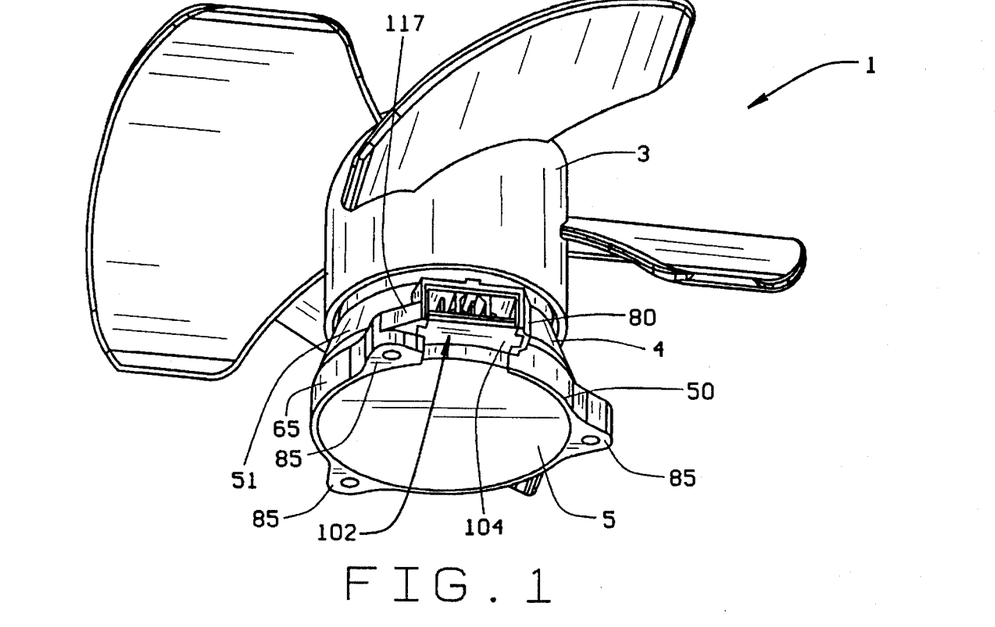
FIG. 1 is a bottom view, in perspective, of one illustrative embodiment of motor assembly equipped with a receptacle of this invention.

Referring now to FIG. 1, reference numeral 1 indicates a brushless permanent magnet motor. The motor 1 includes an integral fan blade assembly 3, which forms no part of the present invention, an enclosure 4, and a cover 5. Motor assembly 1 also includes a stator assembly 7 and a rotor assembly 8, a motor board assembly 9, and a motor control assembly 10, component parts of which are best observed in FIGS. 3 through 8.

The details of the blade assembly, stator assembly and rotor assembly are set out in co-pending application Ser. No. 240,629, filed May 11, 1994, assigned to a common assignee with the present application, the disclosure of which is incorporated herein by reference. The stator assembly 7 is unique among other ways, in that suitable winding termination means 17 is formed on one of the respective ends of the insulation 16 as specifically described in co-pending application, Ser. No. 240,633, filed May 11. 1994, the disclosure of which is incorporated by reference.

Details of the control features and the circuit required for that control are described in the aforementioned application, Ser. No. 237,782, the disclosure of which is incorporated herein by reference.

The enclosure 4 includes a housing 50 having a side wall 51. The side wall 51 defines a cylindrical upper portion 52. The portion 52 extends upwardly from a top wall or plate 53. Plate 53 is formed integrally with enclosure 4. Enclosure 4 has an upper end 55 and a lower end 56, upper and lower ends being referenced to FIG. 3. The plate 53 divides the enclosure into a first, upper chamber 57 and a second, lower chamber 58. The side wall 51 is flared radially outwardly toward the lower end 56, and has another, cylindrical rim section 65 at the lower end 56, which is generally circular in plan. The housing 50 also has integral with it, spaced along an outer surface of the cylindrical part or rim 65, a plurality of mounting pads 85 by which the motor assembly 1 is attached to a bracket or mounting plate in its intended application.

Figure 3:
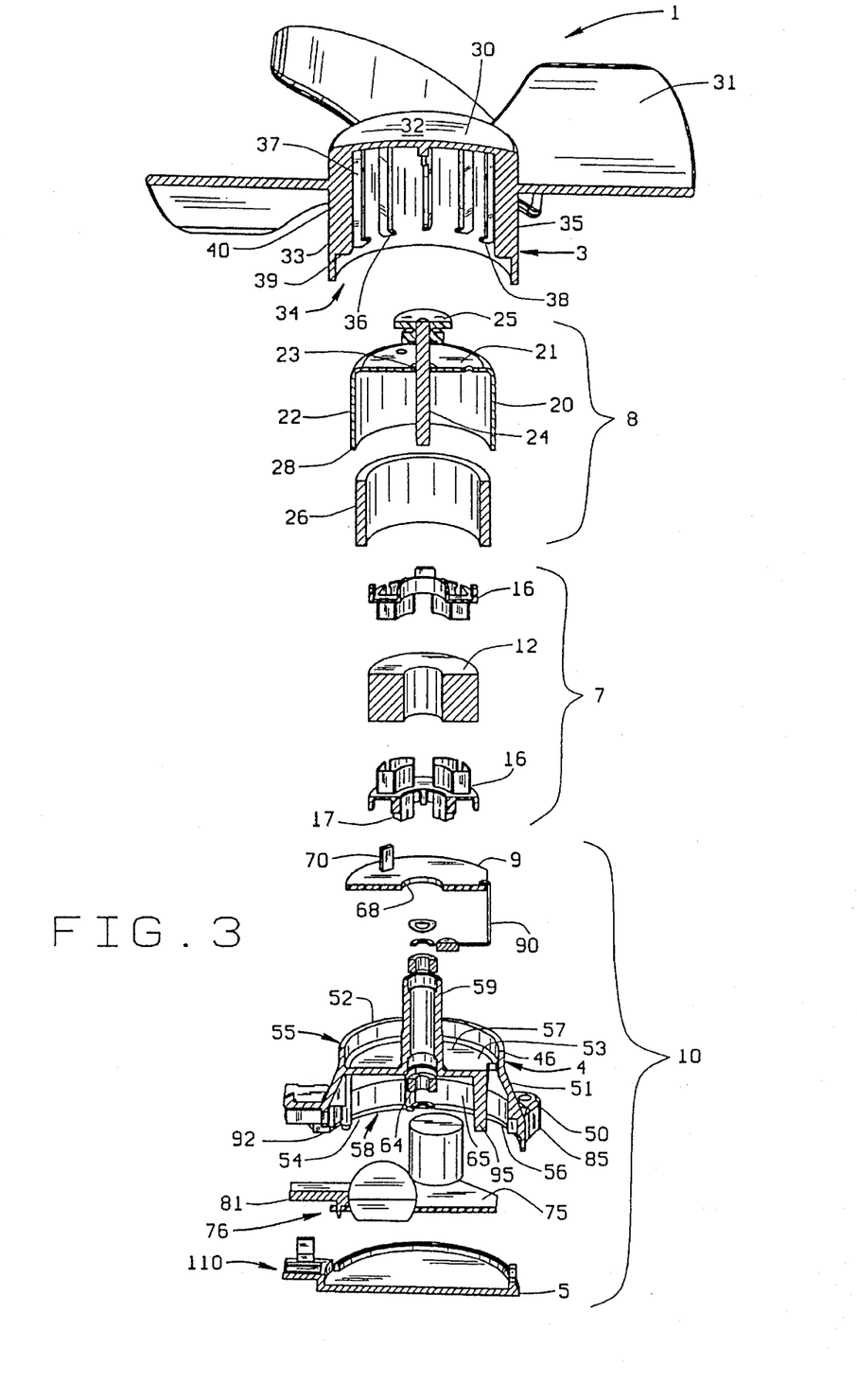
FIG. 3 is an exploded view of the motor shown in FIG. 1.

Plate 53 has a hub 59 extending upwardly from it. Chamber 57 is sized to receive motor board 9. Motor board 9 is a circuit board, at least one surface of which has a plurality of electrical connections and components associated with it. These components are illustratively indicated by the reference numeral 70. The motor board 9 has a central opening 68 formed in it, permitting the board (and stator assembly) to be mounted over the hub 59 to position the board 9 in the chamber 57. Plate 53 also has an opening 46 formed in it, which permits communication between the chamber 57 and the chamber 58.

The stator assembly, wound and with appropriate ends of the windings mounted in termination means 17, is secured to the printed circuit (motor) board 9 by spade terminals that make electrical contact with the winding ends, and, passing through suitable passages in the motor board 9, on the opposite side of the board are electrically connected with electrical conductors of connections 90. Each of the termination means 17 is in the form of a leg with a slit in it with a closed end adjacent the stator. A winding lead end is pulled through the slit to lie transversely of the leg. The leg also has a connector-receiving channel in it, parallel to the slit, to receive the spade terminal and to provide intimate physical and electrical contact between the end of the terminal and the end of the winding.

Chamber 58 is sized to receive the motor control assembly 10. The control assembly 10 includes a circuit board 75 having a plurality of components associated with it, generally illustratively indicated by the reference numeral 76. It is electrically connected to the motor board 9 by the connector 90. Details of the control portions of the motor assembly 1 are contained in the above referenced co-pending application Ser. No. 237,782, incorporated herein by reference.

Figure 2:
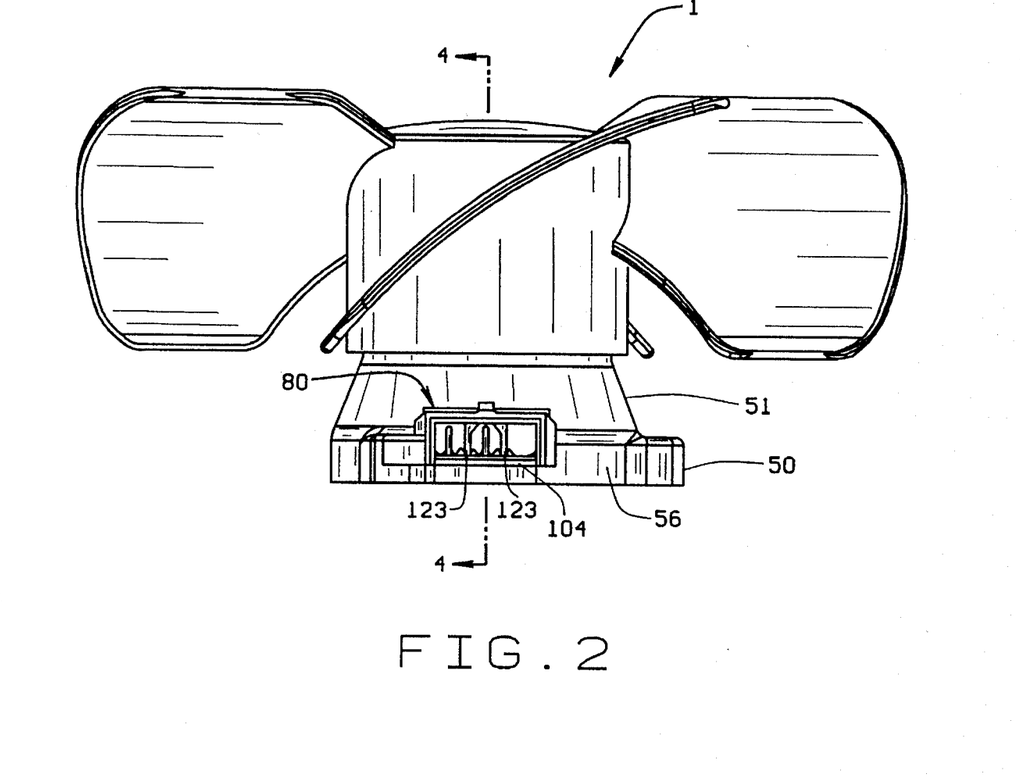
FIG. 2 is a side view thereof.
Figure 4:
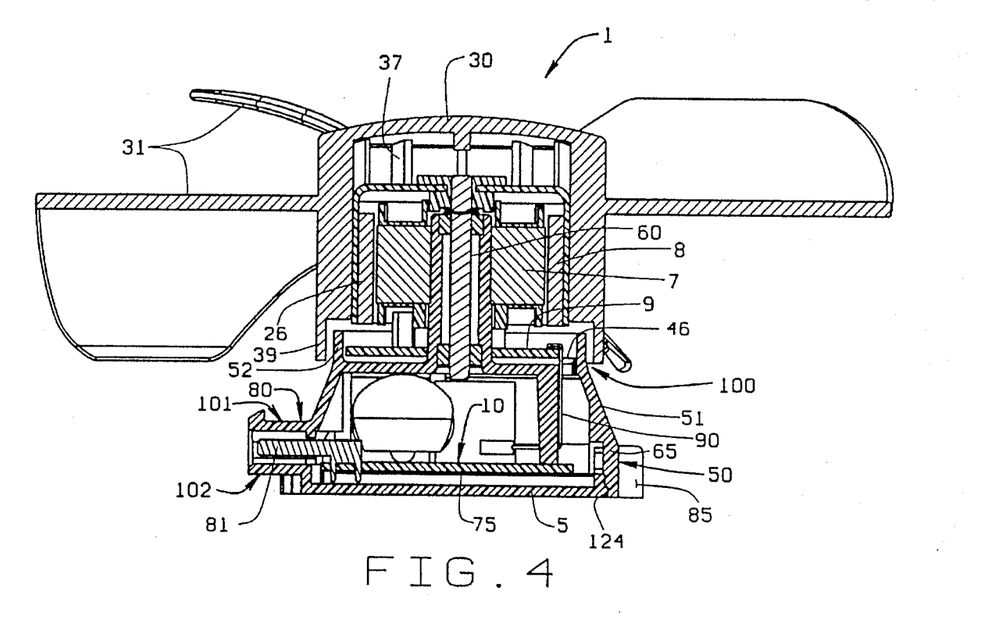
FIG. 4 is a sectional view taken along the 4—4 of FIG. 2.
Figure 5:
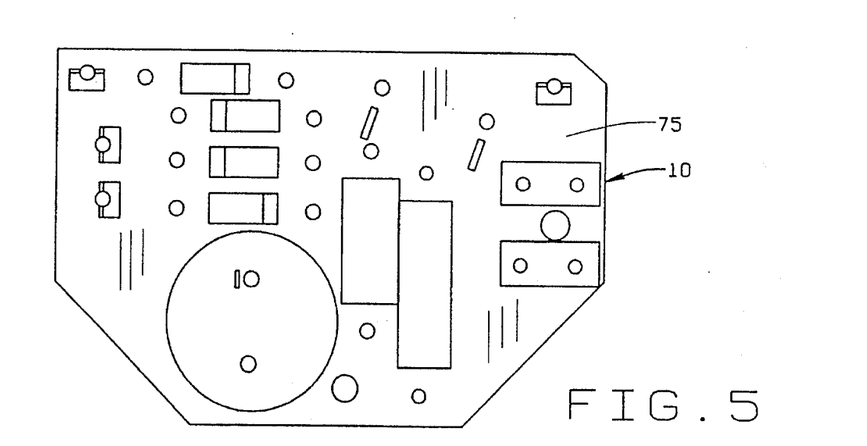
FIG. 5 is an enlarged bottom plan view of a motor control board.
Figure 6:
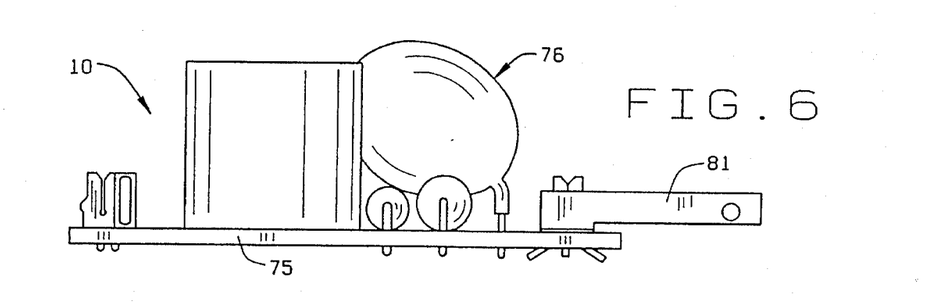
FIG. 6 is a view in side elevation of the control board shown in FIG. 5.

As shown in FIGS. 1, 2, and 4, the housing 50 and cover 5 cooperate to define a connector block or receptacle 80. Receptacle 80 is sized to receive a plurality of male electrical power conductors, blades or prongs 81. The prongs 81 are shown as flat and thin relative to their height, and oriented parallel to and spaced from one another to receive female terminals of a conventional plug, not here shown. The prongs 81 are electrically and physically attached to the circuit elements of the board 75 in a conventional manner. They constitute the input power connection for the motor assembly 1. The electrical connection 90 extends between the motor board 9 and the board 75 through the opening 46 in the plate 53. Again, various features of the connection are described in the co-pending applications incorporated herein by reference. It is here noted that the board 75 generally is a high voltage input board, and the board 9 is a low voltage board from which the stator assembly 7 is operated.

The cover 5 is sized to close the chamber 58.

Referring now to FIGS. 1 through 11 for one illustrative embodiment of this invention, the receptacle 80 is made in two parts, a housing receptacle part 101 and a cover receptacle part 102. The housing receptacle part 101 is made of a piece with the housing base 51, as shown particularly in FIGS. 3, 4, 7, and 8. It is made up of a top wall 105, a back wall 107 and end walls 109 and 111. The back wall 107 has in it prong-receiving slots 113, each with a flaring mouth 115 to facilitate the installation of the prongs or blades 81. The end walls 109 and 111 are essentially mirror images of one another, although, in the device illustrated, the wall 111 is formed with a gusset 117 from a mounting boss 85. Intermediate walls 123, integral with the back wall 107 and top wall 105, serve to define channels to receive blades 81.

Figure 7:
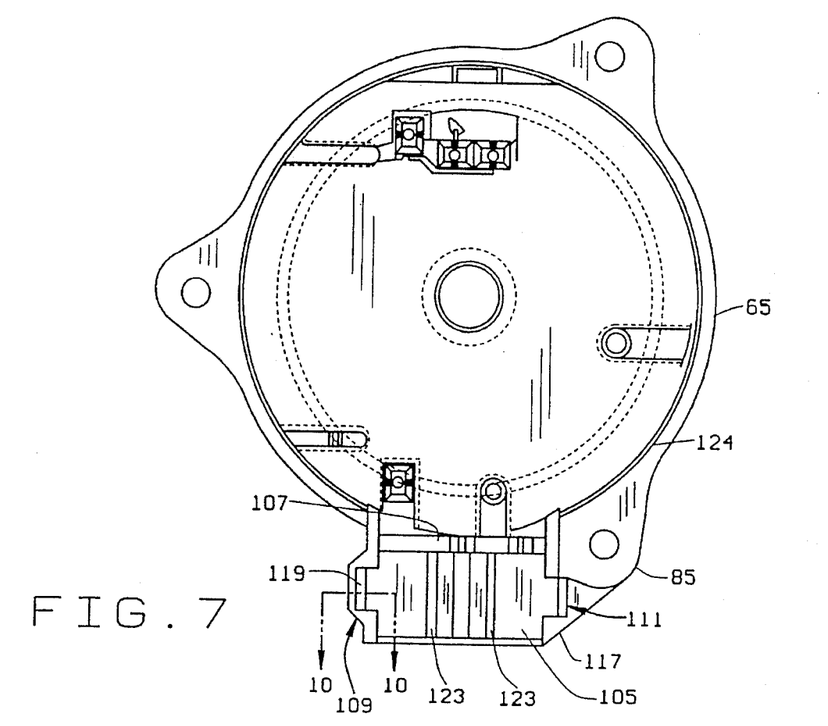
FIG. 7 is a bottom plan view of a base-housing of the motor shown in FIG. 1, without a cover, showing an empty housing receptacle part.
Figure 8:
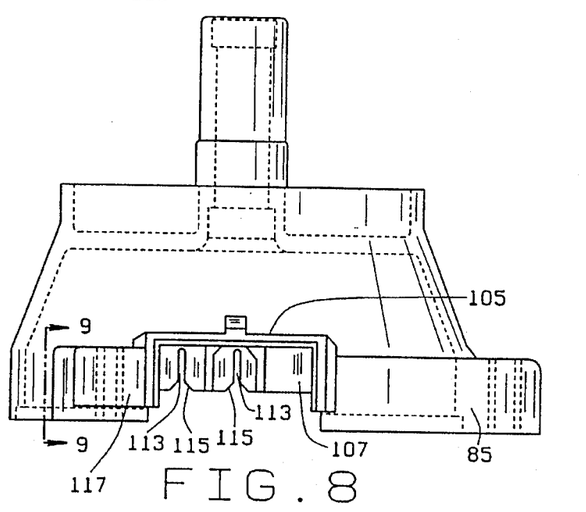
FIG. 8 is a view in front elevation of the housing of FIG. 7, also showing the housing receptacle part.
Figure 9:
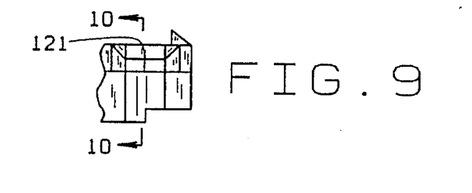
FIG. 9 is a fragmentary view in side elevation of a portion of the housing receptacle part of FIGS. 7 and 8.
Figure 10:
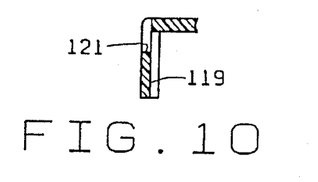
FIG. 10 is a sectional view, taken along the line 10—10 of FIG. 9.
Figure 11:
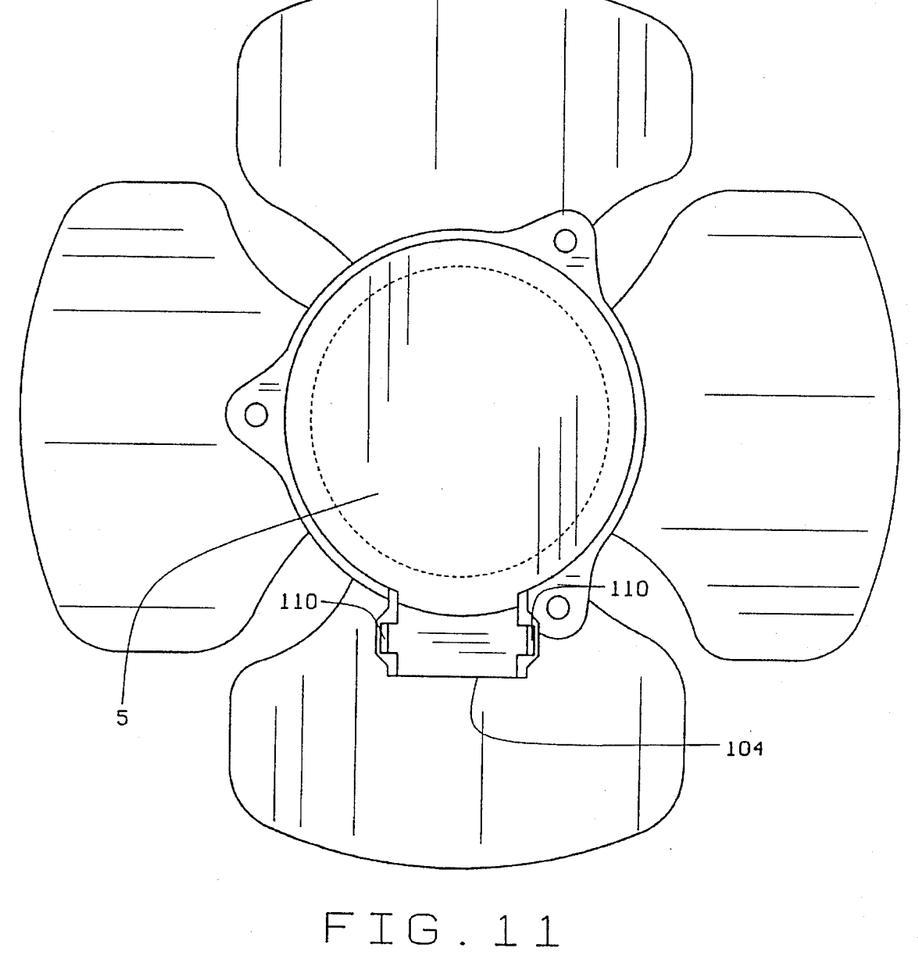
FIG. 11 is a bottom plan view of the motor shown in FIG. 1, with a cover in place on the base-housing.

Both of the end walls 109 and 111 have an offset section defining channels 119, extending parallel with one another height-wise of the end walls, substantially perpendicular to the top wall 105. The upper end of the channels ends with a flat surface, ledge 121.

Figure 12:
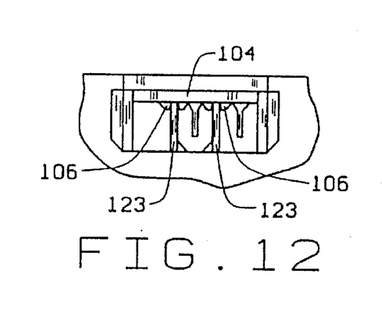
FIG. 12 is a fragmentary view in front elevation of the housing receptacle part.

The cover 5 is shaped complementarily to a seat 124 in the lower end 56 of the housing 50. The cover receptacle part 102 projects chordally, and is also shaped complementarily to the housing receptacle part 101, to serve as a closure for that housing receptacle part and to complete the receptacle 80. The cover receptacle part has a bottom wall 104, from which locating lugs 106 project, to embrace top edges of the intermediate walls 123, as shown particularly in FIGS. 12 and 13. Latching fingers 110, of a piece at their lower ends with opposite edges of the wall 104, project upwardly, as shown particularly in FIG. 13. Each of the fingers 110 has an outwardly projecting lip 112, above which is an inwardly upwardly sloping cam surface 114. The fingers 110 are parallel to one another and perpendicular to the bottom wall 104. They are spaced to fit closely within the channels 119, with the lips 112 projecting over and engaging the top edge 121 of the channel wall. The cover 5 and the fingers 10 are made of an electrically insulative plastic material that permits the fingers to flex or deflect sufficiently to permit the lips' being cammed away from the broad wall defining the bottom of the channel, and to snap into space over the top edge or ledge 121.

Figure 13:
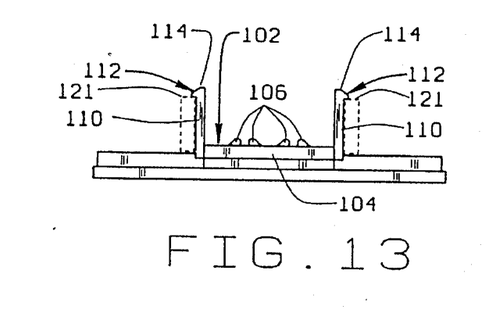
FIG. 13 is a view in front elevation of a cover, showing a cover receptacle part.

The engagement of the lips 112 and the ledges 121 serves to hold the entire cover in place. Because the lips extend outboardly, they are readily accessible to a screwdriver blade or the like, by which they can be moved inwardly to clear the ledges.

Figures 14, 15, 16:
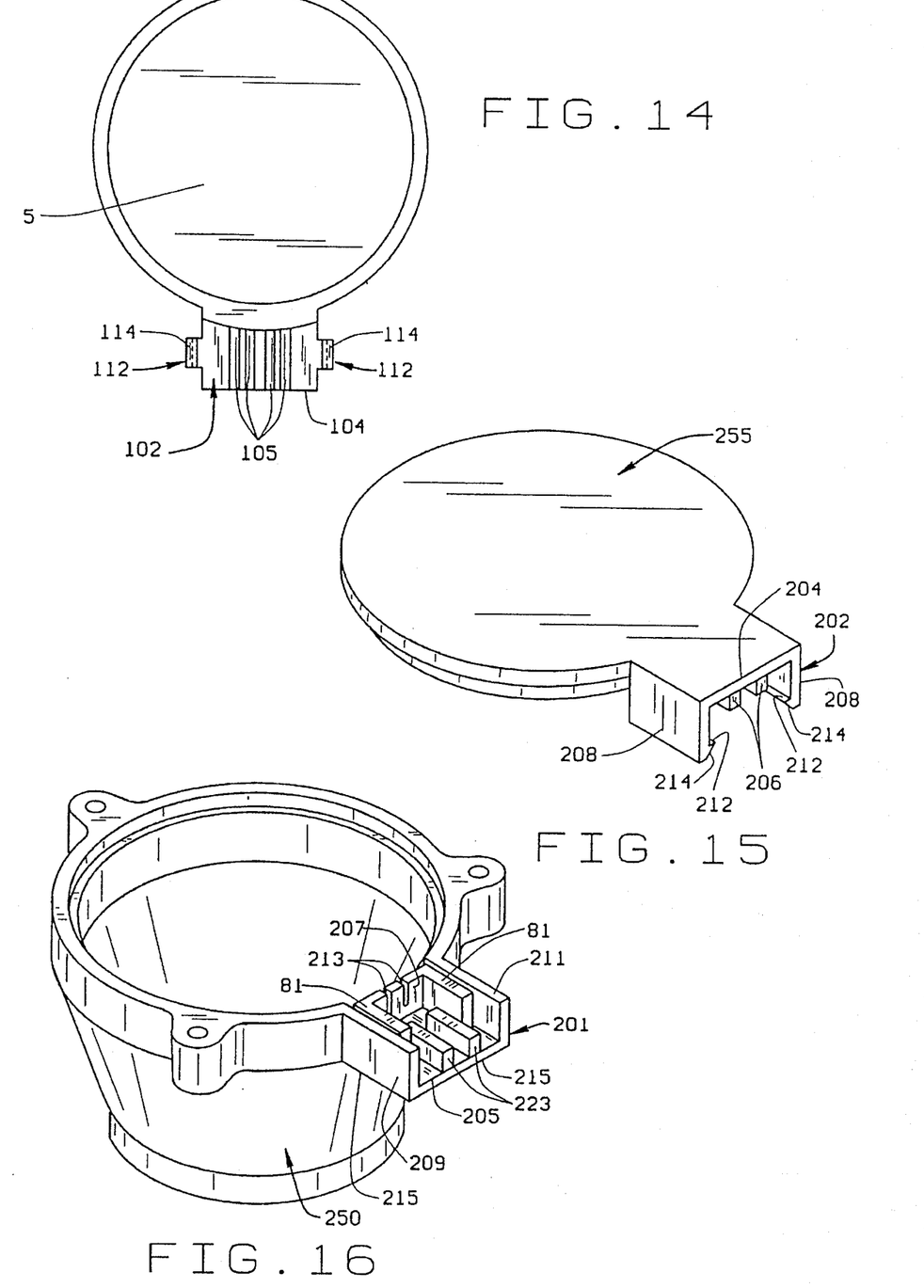
FIG. 14 is a top plan view of the cover shown in FIG. 13.
FIG. 15 is a front perspective view of a cover of another embodiment of motor, showing a cover receptacle part.
FIG. 16 is a bottom perspective view of a housing to which the cover of FIG. 15 is applied, and showing a housing receptacle part.

Referring now to FIGS. 15 through 16 for another embodiment of receptacle, reference numeral 250 indicates a housing which is essentially like the housing 50 of the first embodiment. Like the housing 50, the housing 250 has a housing receptacle part 201 forming a part of a receptacle 80. The housing receptacle part 201 has a top wall 205, a back wall 207, and end walls 209 and 211. The back wall 207 has slots 213 of the same type and serving the same purpose as the slots 113 of the first embodiment. The receptacle part 201 also has intermediate walls 223, corresponding to the intermediate walls 123 of the first embodiment.

Unlike the end walls 109 and 111, the end walls 209 and 211 have planar external surfaces. Unlike the side wall 111 of the first embodiment, the side wall 211 is separated from any boss 85.

A cover 255 has a cover receptacle part 202 with a bottom wall 204, from which cover intermediate walls or lugs 206 project, and end walls 208. The walls 206 overlie the intermediate walls 123, to complete channels for blades or prongs 81. In this embodiment, the end walls themselves constitute latching fingers. They have, at their outer ends, facing, inwardly extending lips 212, with camming surfaces 214. The end walls 208 are spaced to fit closely around the end walls 209 and 211 of the housing receptacle part, to permit the lips 212 to snap over flat top surface 215 of top wall 205. The surface 215 constitutes the ledges of this embodiment.

As can be seen, when the cover receptacle part is pushed over and onto the housing receptacle part, the camming surfaces 214 flex the end walls 208 outwardly until the lips have cleared the top of the top wall 205, when the lips snap into place. As in the first embodiment described, the lips are readily accessible, and can be spread apart by any suitable means sufficiently to permit the cover to be removed.

The provision of the receptacle as a part of the housing and cover simplifies the construction of the motor, and makes it more economical, both in terms of parts and labor.

As is apparent from the above description, the motor assembly 1 is constructed entirely without the use of threaded fasteners or other similar mechanical types of fasteners. In addition, the construction of the assembly 1 is substantially simplified and may be automated in a number of respects. As has been explained above, the cup 20-shaft 24 combination is constructed, and the stator assembly 7 insulated and wound. As described in application Ser. No 240,633/08, motor winding turn ends are associated with the winding termination 17 of the insulation system 16 employed with the stator assembly 7. That permits the stator assembly to be plugged into the board 9, thereby making the electrical connection between the windings 15 of the stator assembly 7 and the board 9 merely by that interconnection. Likewise, use of the connection 90 permits the board 75 to be interconnected to the connector 90 again, merely by the placement of the board 75 into the chamber 58. Toward that end, an electrical interconnect may be formed integrally with the plate 53 to position the connection 90 with respect to the board 75. The attachment of the male electrical connections 81 directly to the board 75 and their extension through receptacle 80, again, is accomplished merely by component placement, and the cover is simply snapped into place to complete the receptacle in either embodiment. The arrangement permits automation of motor assembly manufacture in a way not available with prior art rotor construction.

Numerous variations in the construction of the receptacles and their components, within the scope of the appended claims, will occur to those skilled in the art in light of the foregoing disclosure. Merely by way of example, the latching fingers can be formed on the housing retainer, rather than on the cover. In that case, the cover is preferably formed with a ledge positioned above the lower surface of the cover. A hook can be provided on one of the cover and housing, diametrically opposite the receptacle, to provide an additional support for the cover, the cover swinging down around the hook when the fingers are released. The lips of the fingers can be directed toward one another in the first embodiment, and a ledge provided by a bar across the open side of the channel spaced to permit the lips to be cammed outwardly and then to snap over the bar. The housing can be formed of a more rigid material than the cover, in the embodiment in which the cover carries the fingers, or the cover, if the fingers are carried by the housing. The lip can be provided on only one of the fingers in the first embodiment, or one of the end walls in the second, although two are preferred. If one of the housing and cover is made of metal, provision can be made for a third prong or blade, to accommodate a grounding conductor, merely by forming another slot in the back wall of the receptacle. In the embodiment in which latching fingers project from the cover into channels in the housing receptacle part, they may project from and be integral with wings of the cover that protect the open ends of the channels, rather than from side edges of the cover receptacle part. The male connector prongs can be round or oval in cross-section, or otherwise shaped. Other prong-positioning provisions can be made. These variations are merely illustrative.

Having thus described the invention, what we claim is:

1. A motor enclosure comprising:

a hollow base-housing with an open mouth defined by at least one side wall, said base defining a predetermined configuration for said open mouth;

a cover-closure for the open mouth of said base, said cover closure having a shape complementary to the configuration of said mouth, said cover closure having a cover receptacle part;

an electrical motor circuit and power conductors electrically connected to said circuit at one end and adapted to be connected to a source of power at another end, said conductors being in the form of spaced, parallel electrical interconnect devices;

a housing receptacle part projecting outwardly of said side wall, said receptacle having a back wall and at least one side wall, said back wall having electrical interconnect device receiving openings formed in it in which said electrical interconnect devices are seated, and at least one intermediate wall, said at least one intermediate wall defining with said side wall, at least two electrical interconnect device receiving channels, said side wall having at least one channel formed in it, opening inwardly, an upper edge of which defines a ledge, said housing receptacle part being open along the open mouth of said base housing, said cover closure receptacle part having a size and shape to cover said housing receptacle open bottom; and at least one latching finger attached at one end to said cover closure receptacle part, said latching finger having a free second end, said latching finger having a shape, size and position to extend into said channel, and having an oppositely disposed, outwardly directed leg at the free end of said finger, engaging said ledge so as to hold said cover in place, said finger being deflectable to permit the lip to snap over the ledge in a cover holding position, and to be disengaged manually to permit the cover to be removed.

2. The motor enclosure of claim 1 wherein said electrical interconnect devices are male connector prongs.

3. The motor enclosure of claim 2 wherein the said prongs are flat and thin relative to their width, and said seats comprise slots opening outwardly slidingly to admit said conductors by translation in a direction perpendicular to the long axis of said connector prongs.

4. The cover of claim 3 wherein said cover receptacle part is generally rectangular with two short sides extending chordally, and respective fingers extend from opposite sides of said cover with said lips projecting at opposite directions; said housing receptacle part being defined in part by side walls, and inwardly opening channels in said side walls, said channels being open ended, ending short of a top wall and defining said lip receiving ledges by their upper ends.

5. In a motor with a hollow base-housing with an open mouth defined by a side wall generally circular in plan view, and a complementarily generally circular cover-closure for said mouth, an electrical motor circuit and power conductors electrically connected to said circuit at one end and adapted to be connected to a source of power at another end, said conductors being in the form of spaced, parallel male connector blades, the improvement comprising a housing receptacle part projecting chordally outboardly of said side wall, said receptacle having a back wall, a top wall and spaced parallel end walls, said back wall having conductor receiving slots in which said power conductor blades are seated, and intermediate walls, parallel with said end walls, defining blade-receiving channels, said end walls having channels in them, opening inwardly and open at both ends, an upper edge of each of which defines a ledge, said housing receptacle being open along its bottom and chordally outer side, and said cover having a cover receptacle part, said cover receptacle part having a chordally extending bottom wall of a size and shape to cover said housing receptacle open bottom, and latching fingers attached at one end with said cover wall, and having a free second end, said latching fingers having a shape, size and position to extend into said finger-receiving channels, and having oppositely disposed, outboardly directed lips at the free ends of said fingers, engaging said ledges and holding said cover in place, said fingers being deflectable to permit the lips to snap over the said ledges to hold the cover and receptacle bottom wall in place, and to be disengaged manually to permit the cover to be removed.

6. The improvement of claim 5 including lugs on said cover receptacle wall, positioned to engage the said intermediate walls and positioned sufficiently inboard of the outer ends of said prongs to permit connection of said prongs to a female plug.

* * * * *